US010989276B2

(12) United States Patent
Moritani et al.

(10) Patent No.: US 10,989,276 B2
(45) Date of Patent: Apr. 27, 2021

(54) GEAR MOTOR AND ASSEMBLING METHOD THEREOF

(71) Applicant: SUMITOMO HEAVY INDUSTRIES, LTD., Tokyo (JP)

(72) Inventors: Koji Moritani, Kanagawa (JP); Mitsuhiro Tamura, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 144 days.

(21) Appl. No.: 16/196,518

(22) Filed: Nov. 20, 2018

(65) Prior Publication Data

US 2019/0162271 A1    May 30, 2019

(30) Foreign Application Priority Data

Nov. 28, 2017    (JP) .............................. JP2017-227398

(51) Int. Cl.
*F16H 49/00* (2006.01)
*F16H 1/32* (2006.01)
(Continued)

(52) U.S. Cl.
CPC ............. *F16H 1/06* (2013.01); *F16H 37/041* (2013.01); *F16H 49/001* (2013.01);
(Continued)

(58) Field of Classification Search
CPC .......... F16H 49/001; F16H 1/32; H02K 7/116
See application file for complete search history.

(56) References Cited

U.S. PATENT DOCUMENTS 4,825,720 A * 5/1989 Capdepuy .............. H02K 7/116
74/640
5,043,613 A * 8/1991 Kurata ................... H02K 37/24
310/49.13
(Continued)

FOREIGN PATENT DOCUMENTS

CN       101868648 A * 10/2010 ............... F16H 1/32
CN       101868648 A     10/2010
(Continued)

OTHER PUBLICATIONS

Office Action issued in Chinese Application No. 201811338153.1, dated Jul. 10, 2020.

*Primary Examiner* — Sherry L Estremsky
(74) *Attorney, Agent, or Firm* — Michael Best & Friedrich LLP (57) ABSTRACT

A gear motor includes a speed reducer and a motor. The speed reducer includes an internal gear, an external gear, an input shaft having an oscillating portion oscillating the external gear, an oscillating bearing which is disposed between the external gear and the oscillating portion, and an input bearing which supports the input shaft, the input shaft includes a protrusion portion which protrudes from the motor side such that a rotor of the motor is provided in the protrusion portion, and includes a bearing disposition section in which the input bearing is disposed and a rotor disposition section in which the rotor is disposed in this order from the speed reducer side toward the motor side, an outer diameter of the rotor disposition section is equal to or less than an outer diameter of the bearing disposition section, and a rotor magnet is directly fixed to the rotor disposition section.

6 Claims, 8 Drawing Sheets

(51) Int. Cl.

| | |
|---|---|
| *H02K 7/116* | (2006.01) |
| *F16H 1/06* | (2006.01) |
| *F16H 57/022* | (2012.01) |
| *F16H 63/30* | (2006.01) |
| *F16H 37/04* | (2006.01) |
| *F16H 57/023* | (2012.01) |
| *F16H 57/031* | (2012.01) |
| *F16H 57/02* | (2012.01) |

(52) U.S. Cl.
CPC ......... *F16H 57/022* (2013.01); *F16H 57/023* (2013.01); *F16H 63/30* (2013.01); *H02K 7/116* (2013.01); *F16H 57/031* (2013.01); *F16H 2057/02073* (2013.01)

(56) References Cited

U.S. PATENT DOCUMENTS

| | | | |
|---|---|---|---|
| 9,382,949 B2 * | 7/2016 | Nishitani | F16D 1/04 |
| 9,397,533 B2 * | 7/2016 | Takuno | F16H 1/32 |
| 2009/0178506 A1 * | 7/2009 | Yamamoto | B25J 9/102 |
| | | | 74/490.03 |
| 2013/0333505 A1 * | 12/2013 | Yeh | F16H 49/001 |
| | | | 74/412 R |
| 2017/0222517 A1 * | 8/2017 | Kobayashi | H02K 7/116 |
| 2020/0003256 A1 * | 1/2020 | Koroyasu | G01L 3/14 |

FOREIGN PATENT DOCUMENTS

| | | | | |
|---|---|---|---|---|
| CN | 101939562 A | | 1/2011 | |
| DE | 102017128872 A1 * | | 6/2018 | ........... F16H 49/001 |
| JP | 2009-150520 A | | 7/2009 | |

\* cited by examiner

FIG. 7

GEAR MOTOR AND ASSEMBLING METHOD THEREOF

RELATED APPLICATIONS

Priority is claimed to Japanese Patent Application No. 2017-227398, filed Nov. 28, 2017, the entire content of which is incorporated herein by reference.

BACKGROUND

Technical Field

Certain embodiment of the present invention relates to a gear motor including a speed reducer and a motor and an assembling method thereof.

Description of Related Art

The related art discloses a gear motor including a speed reducer and a motor. In the gear motor, an input shaft of the speed reducer protrudes toward the motor side, and a rotor of the motor is provided on a protruding portion. The rotor includes an intervening member which is fixed to an outer periphery of the protruding portion of the input shaft and a rotor magnet which is fixed to an outer periphery of the intervening member.

SUMMARY

According to an embodiment of the present invention, there is provided a gear motor including: a speed reducer; and a motor, in which the speed reducer includes an internal gear, an external gear which internally meshes with the internal gear, an input shaft which includes an oscillating portion oscillating the external gear, an oscillating bearing which is disposed between the external gear and the oscillating portion, and an input bearing which supports the input shaft, in which the input shaft includes a protrusion portion which protrudes from the motor side such that a rotor of the motor is provided in the protrusion portion, and includes an input bearing disposition section in which the input bearing is disposed and a rotor disposition section in which the rotor is disposed in this order from a speed reducer side toward the motor side, an outer diameter of the rotor disposition section is equal to or less than an outer diameter of the input bearing disposition section, and a rotor magnet is directly fixed to the rotor disposition section.

According to another embodiment of the present invention, there is provided an assembling method of a gear motor including a first internal gear, a second internal gear, a main bearing which is disposed between the first internal gear and the second internal gear and rotates the first internal gear and the second internal gear relative to each other, an external gear which internally meshes with the first internal gear and the second internal gear, an input shaft which includes an oscillating portion oscillating the external gear and a protrusion portion which protrudes from the motor side such that the rotor is provided in the protrusion portion, an oscillating bearing which is disposed between the oscillating portion and the external gear, an input bearing which supports the motor side of the input shaft, a counter-motor side input bearing which supports a counter-motor side of the input shaft, and a bearing housing which supports the counter-motor side input bearing, the method including: a step of assembling an internal gear assembly in which the first internal gear and the second internal gear are assembled to each other via the main bearing; a step of assembling an input shaft assembly in which the oscillating bearing, the external gear, the input bearing, and the counter-motor side input bearing are assembled to the input shaft; a step of externally fitting the internal gear assembly to the input shaft assembly from the motor side; and a step of externally fitting the bearing housing to the input shaft assembly from the counter-motor side.

DETAILED DESCRIPTION

However, in the gear motor of the related art, the rotor magnet is fixed to the protruding portion of the input shaft of the speed reducer via the intervening member, a dimensional tolerance of the intervening member and a dimensional tolerance of the rotor magnet are combined with each other, and thus, there is a problem that positional accuracy of the rotor magnet decreases.

In a gear motor including a speed reducer and a motor, it is desirable to provide a gear motor in which a rotor magnet can be provided with high positional accuracy and an assembling method thereof.

According to the present invention, in a gear motor including a speed reducer and a motor, it is possible to provide a gear motor in which a rotor magnet can be provided with high positional accuracy and an assembling method thereof.

Hereinafter, an embodiment of the present invention will be described in detail with reference to the drawings.

Figure 1:
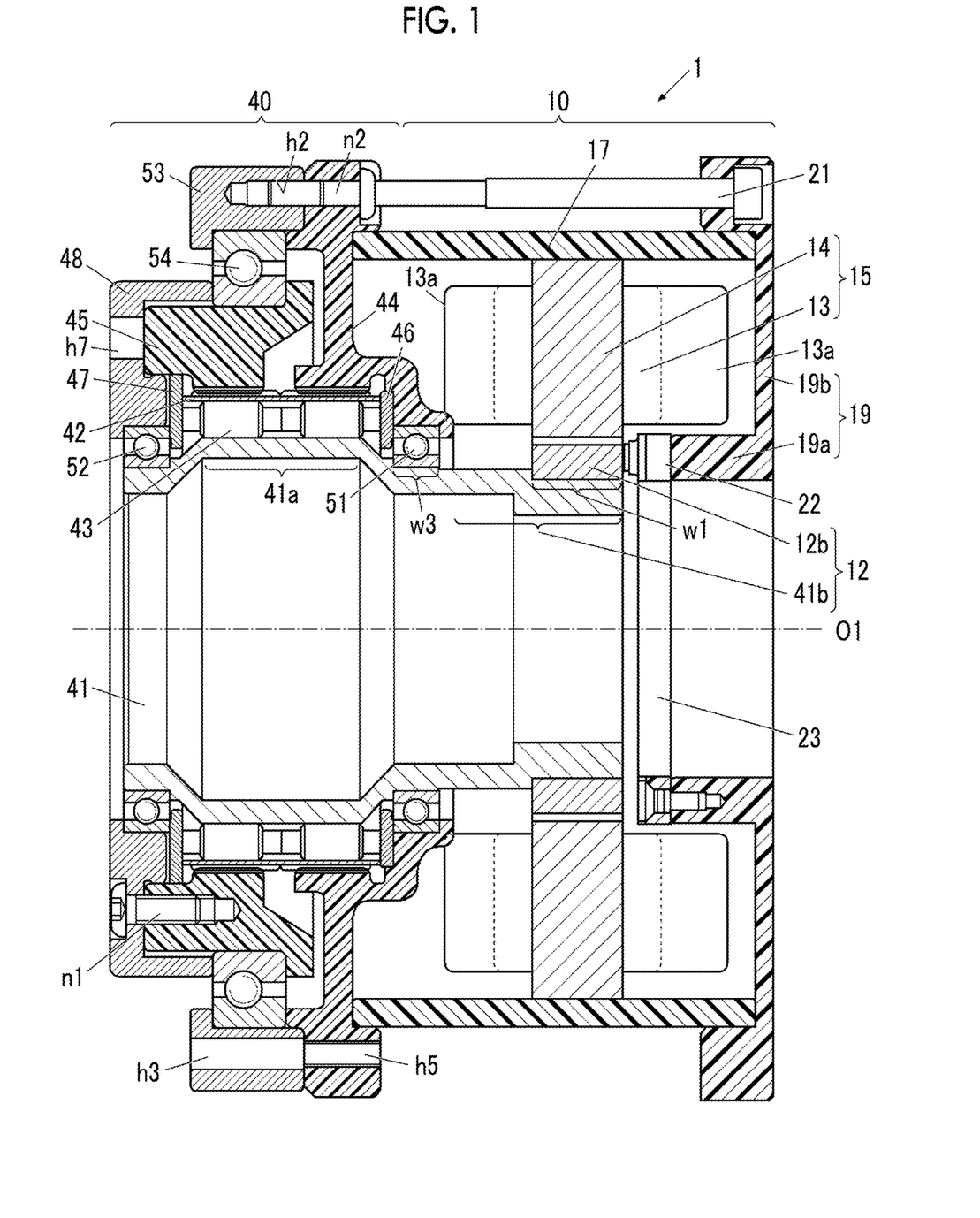
FIG. 1 is a sectional view showing a gear motor according to an embodiment of the present invention.
Figure 2:
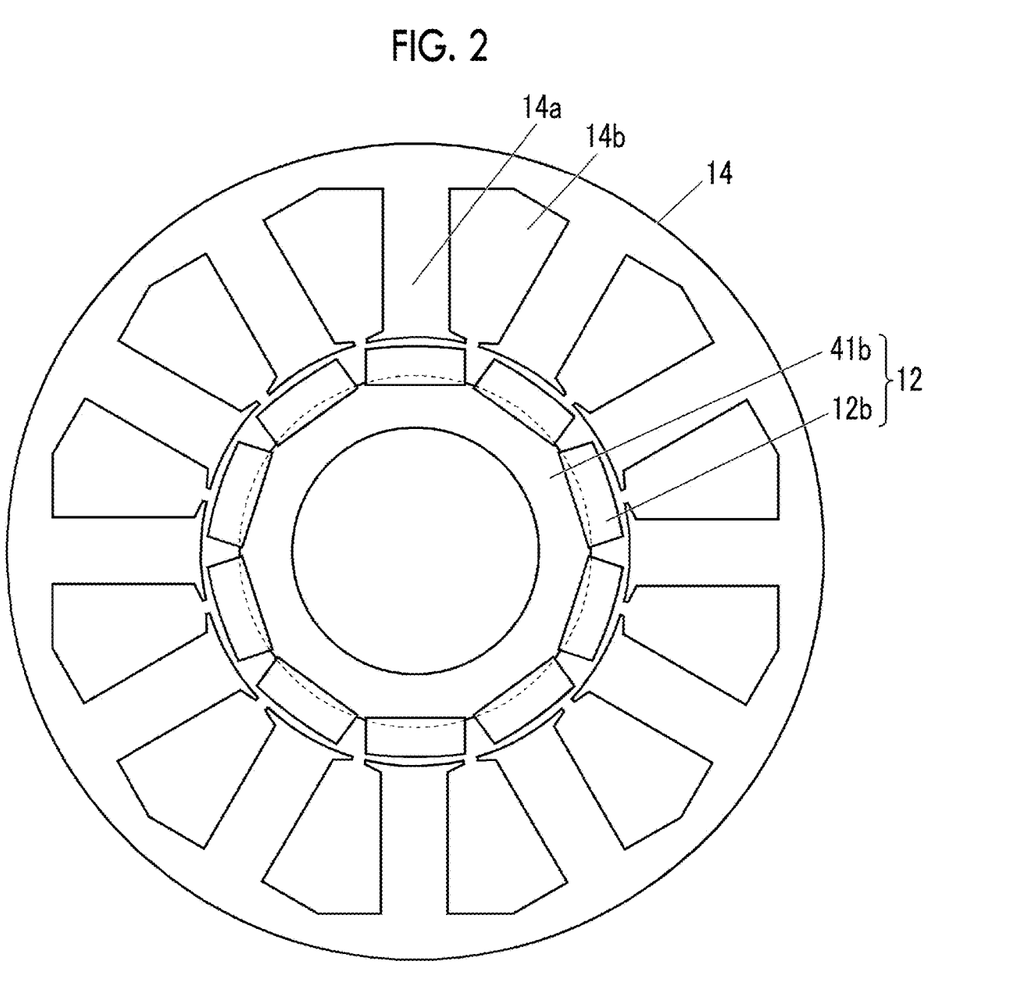
FIG. 2 is a front view showing a stator core and a rotor of the motor.
Figure 3:
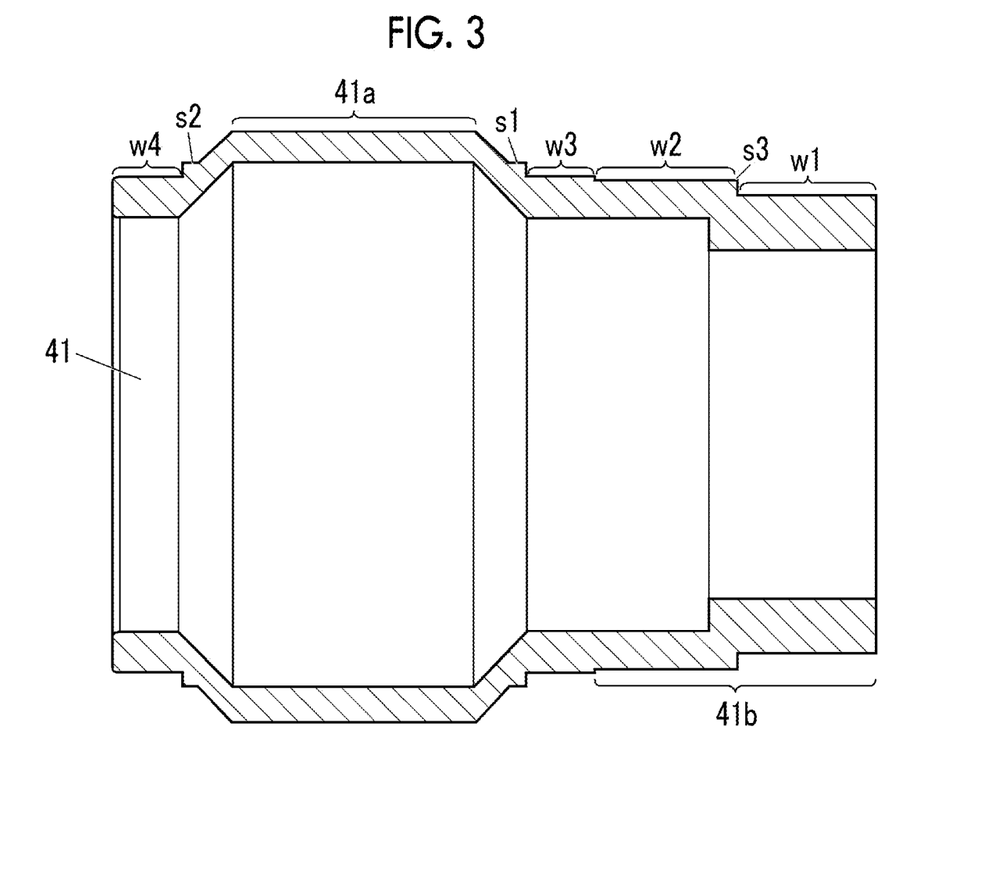
FIG. 3 is a sectional view showing an input shaft.
Figure 4A:
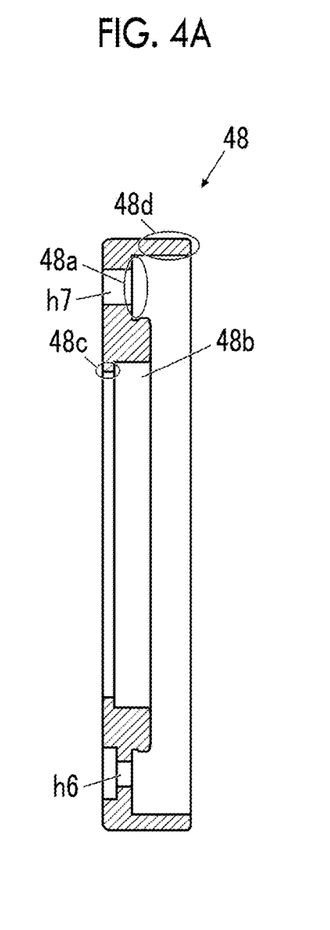
FIG. 4A is a sectional view showing a housing.
Figure 4B:
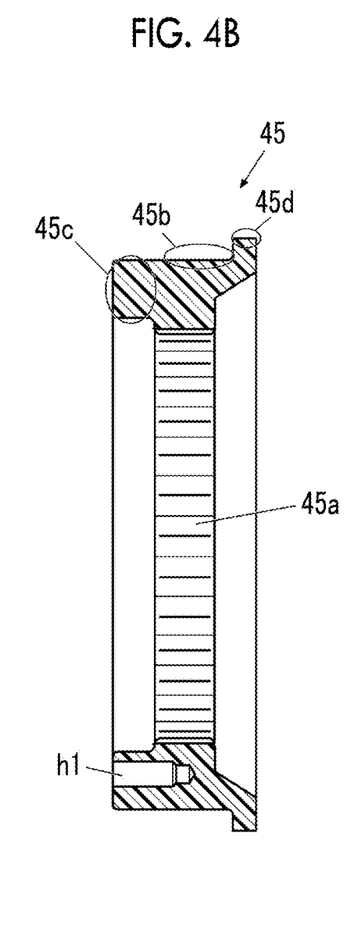
FIG. 4B is a sectional view showing a second internal gear.
Figure 4C:
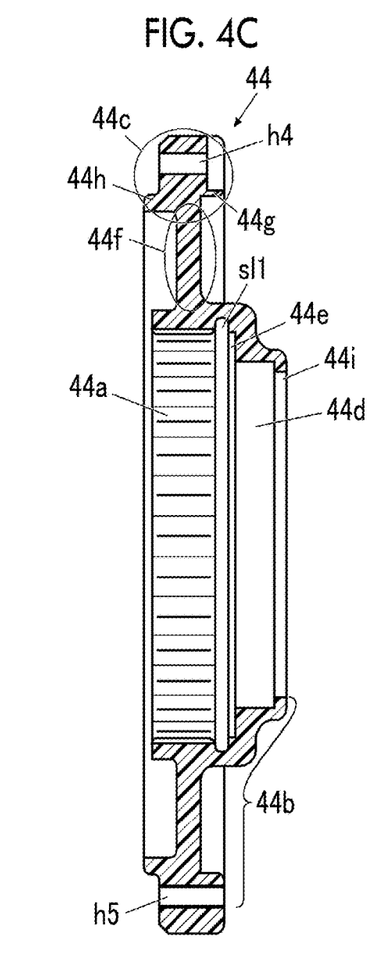
FIG. 4C is a sectional view showing a first internal gear.

FIG. 1 is a sectional view showing a gear motor according to an embodiment of the present invention. FIG. 2 is a front view showing a stator core and a rotor of the motor of FIG. 1. FIG. 3 is a sectional view showing an input shaft. FIG. 4A is a sectional view showing a housing, FIG. 4B is a sectional view showing a second internal gear, and FIG. 4C is a sectional view showing a first internal gear. In the present specification, a direction along a central axis O1 of an input shaft 41 is defined as an axial direction, a direction orthogonal to the central axis O1 is defined as a radial direction, and a direction rotating about the central axis O1 is defined as a circumferential direction.

A gear motor 1 of the present embodiment is a gear motor in which a motor 10 and a speed reducer 40 are connected to each other so as to be unified.

Motor

The motor 10 includes a protrusion portion 41b, which is a rotor shaft, of an input shaft 41 which becomes a rotor shaft, a rotor magnet (permanent magnet) 12b, a coil 13, and a stator core 14. The protrusion portion 41b of the input shaft 41 and the rotor magnet 12b constitutes a rotor 12 and a coil 13 and a stator core 14 constitutes a stator 15. In addition, the motor 10 includes a tubular motor frame 17 which covers an outer peripheral side of the stator 15 and a motor cover 19 which covers one side (a counter-load side: a side opposite to the speed reducer 40) of each of the stator 15 and the motor frame 17 in the axial direction. Moreover, one side (load side: speed reducer 40 side) of each of the stator 15 and the motor frame 17 in the axial direction is partitioned by a first internal gear 44 of the speed reducer 40. A portion of the first internal gear 44 which covers a portion of the motor 10 is referred to as a cover section 44b (refer to FIG. 6).

The stator core 14 is formed of a magnetic body, and as shown in FIG. 2, includes a plurality of core segments 14a and a plurality of slots 14b. The plurality of core segments 14a are disposed to be arranged in the circumferential direction such that inner peripheral surfaces of the core segments face the rotor 12. The plurality of slots 14b are provided between the plurality of core segment 14a.

The coil 13 is formed of an aluminum wire and is wound around the core segments 14a through the plurality of slots 14b. A portion of the coil 13 protrudes toward the outside from an end of the stator core 14 in the axial direction. A portion which protrudes in the axial direction from the slots 14b is a coil end 13a.

The protrusion portion 41b of the input shaft 41 constituting the rotor 12 is formed of a metal and has a hollow structure.

The motor frame 17 is formed of a resin and is in contact with an outer peripheral portion of the stator core 14 so as to fix the stator core 14.

A cover section 44b (FIG. 6) which covers a load side of the stator 15 is formed of a resin. In addition, a material of the cover section 44b is not limited to a resin and may be a non-conductive material. For example, the material of the cover section 44b may be a composite material of a resin and other materials or a bake material (a paper bake material, a cloth bake material, or the like). The cover section 44b intercepts between an external gear 42 and a wave generator bearing 43, and the stator 15, and for example, prevents outflow of a lubricant from the speed reducer 40.

The cover section 44b has an annular shape, and includes a through hole, through which the input shaft 41 passes, at a center of the cover section 44b. An input bearing 51 is fitted into an inner peripheral portion of the cover section 44b and the cover section 44b rotatably supports the input shaft 41 via the input bearing 51. The cover section 44b is not particularly limited. For example, the cover section 44b is connected to the motor cover 19 via a bolt 21 and the motor frame 17 is interposed between the cover section 44b and the motor cover 19 so as to be fixed.

In the cover section 44b, the shortest creeping distance from the coil end 13a is shorter than 6.3 mm. In a general motor of the related art, a cover which covers one side of a stator in an axial direction is formed of a conductive material, a creeping distance of the cover is equal to or more than 6.3 mm so as to secure insulation. Accordingly, a volume of a power transmission device increases, an axial length increases, a rotor shaft and an input shaft are lengthened, and thus, there is a problem that weight of the entire device increases. However, in the present embodiment, the cover section 44b has insulation (is formed of a non-conductive material), the creeping distance is shorter than 6.3 mm, and thus, the above-described problems are alleviated. In addition, more preferably, the creeping distance between the cover section 44b and the coil end 13a is equal to or less than 3 mm, and most preferably, the creeping distance is equal to or less than 1 mm.

More specifically, the cover section 44b of the present embodiment is disposed to be in contact with a portion of the coil end 13a of the stator 15. Since the cover section 44b has insulation, even when the above-described contact is generated, sufficient insulation between the coil 13 and the cover section 44b and sufficient insulation between the motor 10 and the speed reducer 40 can be secured. Preferably, a contact area between the cover section 44b and the coil end 13a is 50% or less of a surface area of the coil end 13a on a load side, and more preferably, is 10% or less of the surface area. If the cover section 44b is in contact with the entire coil end 13a, a coefficient of thermal expansion of the coil end 13a is different from a coefficient of thermal expansion of the cover section 44b, and thus, problems arise in durability of the cover section 44b and the coil end 13a. However, by setting the above-described contact area, even when the coefficients of thermal expansion are different from each other, it is possible to suppress a decrease in the durability.

The motor cover 19 which covers a counter-load side of the stator 15 is formed of a resin. In addition, a material of the motor cover 19 is not limited to a resin and may be a non-conductive material. For example, the material of the motor cover 19 may be a composite material of a resin and other materials or a bake material (a paper bake material, a cloth bake material, or the like). In the motor cover 19, a sectional shape in FIG. 1 is an annular shape which is continuous in the circumferential direction. When viewed in the axial direction, a center portion of the motor cover 19 is open such that the motor cover communicates with a hollow portion of the input shaft 41. The motor cover 19 includes an inner wall portion 19a which covers an inner peripheral side of the coil end 13a positioned on the counter-load side in the axial direction and a rear surface wall portion 19b which covers a counter-load side of the stator 15 in the axial direction. The inner wall portion 19a has a tubular shape whose space portion communicates with the hollow portion of the input shaft 41. A load-side end surface of the inner wall portion 19a axially faces the rotor magnet 12b fixed to the input shaft 41. A sensor (magnetic sensor or the like) 22 for detecting a rotation position is provided on a portion in the circumferential direction of the load-side end surface of the inner wall portion 19a. For example, the sensor 22 detects the rotation position of the rotor 12 by detecting a magnetic flux of the rotor magnet 12b. The sensor 22 is fixed via an annular bracket 23 extending along the end surface of the inner wall portion 19a. The inner wall portion 19a corresponds to an example of a tubular portion according to the present invention.

The motor cover 19 is disposed to be close to the coil end 13a such that the shortest creeping distance from the coil end 13a is shorter than 6.3 mm. A portion of the motor cover 19 may be disposed to come into contact with the coil end 13a.

Speed Reducer

FIG. 3 is the sectional view showing the input shaft. FIG. 4A is the sectional view showing the housing, FIG. 4B is a sectional view showing the second internal gear, and FIG. 4C is the sectional view showing the first internal gear.

The speed reducer 40 is a bending meshing type speed reducer and includes the input shaft 41, a wave generator 41a, the external gear 42, the wave generator bearing 43, the first internal gear 44, the second internal gear 45, a first regulating member 46, a second regulating member 47, a bearing housing 48, an input bearing 51, a counter-motor side input bearing 52, a main bearing 54, and an outer peripheral housing 53. Among these, the wave generator 41*a* corresponds to an example of an oscillating portion according to the present invention and the wave generator bearing 43 corresponds to an example of an oscillating bearing according to the present invention.

In the input shaft 41, the wave generator 41*a* and the protrusion portion 41*b* which is the rotor shaft are integrally formed as a single member. The input shaft 41 is a metal shaft having a hollow structure. In the input shaft 41, an outer shape of a cross section of the portion of the wave generator 41*a* orthogonal to the central axis O1 is a non-circular shape (for example, an elliptical shape centered on the central axis O1), and an outer shape of a cross section of the other portion orthogonal to the central axis O1 is a circular shape centered on the central axis O1. In addition, the wave generator 41*a*, the protrusion portion 41*b*, or both of them may be formed as separate bodies and connected to each other to constitute the input shaft 41.

As shown in FIG. 3, in the input shaft 41, a rotor disposition section w1 to which the rotor magnet 12*b* is fixed, an extension section w2 which extends in the axial direction, a first bearing disposition section w3, the wave generator 41*a*, and a second bearing disposition section w4 are provided in this order from the motor 10 side toward the speed reducer 40 side. The first bearing disposition section w3 corresponds to an example of a bearing disposition section according to the present invention.

The input bearing 51 and the counter-motor side input bearing 52 are externally fitted to the first bearing disposition section w3 and the second bearing disposition section w4, respectively. In the input shaft 41, step portions s1 and s2 whose diameters increase stepwise toward the wave generator 41*a* side are provided at portions adjacent to the first bearing disposition section w3 and the second bearing disposition section w4. The input bearing 51 and the counter-motor side input bearing 52 abut against the step portions s1 and s2 and axial positions thereof can be determined.

According to the rotation of the input shaft 41, the wave generator 41*a* bends and oscillates the external gear 42 via the wave generator bearing 43. In an outer diameter of the wave generator 41*a*, the maximum value and the minimum value of the outer diameter are larger than an outer diameter of the first bearing disposition section w3 and an outer diameter of the second bearing disposition section w4. A portion between the first bearing disposition section w3 and the wave generator 41*a* and a portion between the second bearing disposition section w4 and the wave generator 41*a* are inclined such that diameters thereof increase as approaching the wave generator 41*a*. This inclination is provided on both an inner peripheral surface and an outer peripheral surface of the input shaft 41. Thicknesses of the first bearing disposition section w3 and the second bearing disposition section w4 are larger than a thickness of the wave generator 41*a*.

The extension section w2 is provided so as to separate the first bearing disposition section w3 and the rotor disposition section w1 from each other by a predetermined length. An outer diameter of the extension section w2 is the same as the outer diameter of the first bearing disposition section w3. Alternatively, the outer diameter of the extension section w2 may be smaller than the outer diameter of the first bearing disposition section w3 and equal to or more than the outer diameter of the rotor disposition section w1. In addition, all the first bearing disposition section w3, the extension section w2, and the rotor disposition section w1 may have the same outer diameter as each other.

The rotor disposition section w1 is provided on the motor-side (the side of the motor 10) end portion of the input shaft 41. The rotor magnet 12*b* is directly fixed to the rotor disposition section w1. For example, as a method for directly fixing the rotor magnet 12*b*, a method of attaching the rotor magnet 12*b* by an adhesive can be used. A step portion s3 whose diameter increases stepwise toward the extension section w2 side is provided between the rotor disposition section w1 and the extension section w2, the rotor magnet 12*b* abuts against the step portion s3, and thus, an axial position of the rotor magnet 12*b* can be determined.

For example, the external gear 42 is made of a metal, is formed of a bendable metal or resin, and has external teeth provided on an outer peripheral side. The external gear 42 internally meshes with the first internal gear 44 and the second internal gear 45. As shown in FIG. 1, the external gear 42 is assembled along the outer peripheral surface of the wave generator 41*a* in a state where the wave generator bearing 43 is interposed therebetween.

For example, the wave generator bearing 43 is a rolling bearing in which rollers are aligned in two rows in the axial direction, is provided between the wave generator 41*a* and the external gear 42, and can rotate the wave generator 41*a* relative to the external gear 42. The wave generator bearing 43 does not have a dedicated outer ring and inner ring. The outer peripheral surface of the wave generator 41*a* constitutes an inner ring-side rolling surface and the inner peripheral surface of the external gear 42 constitutes an outer ring-side rolling surface. An axial dimension of the outer peripheral surface of the wave generator 41*a* is approximately the same as a width dimension from one end to the other end of the rollers aligned in two rows in the axial direction. An axial movement of the wave generator bearing 43 is regulated by the first regulating member 46 and the second regulating member 47 which are respectively disposed on one end side and the other end side of the wave generator bearing 43.

The first internal gear 44 has an annular configuration in which a sectional shape (except for screw holes h4 and h5) of FIG. 4C is continuous in the circumferential direction, and the screw holes h4 and h5 are provided at a plurality of locations in the circumferential direction. The first internal gear 44 includes a tooth section 44*a* on which internal teeth are provided, a cover section 44*b* which covers the load side of the stator 15, a peripheral end portion 44*c* which is connected to the outer peripheral housing 53 and the motor cover 19, a bearing disposition section 44*d* to which the input bearing 51 is internally fitted, a regulating member disposition section 44*e* to which the first regulating member 46 is fitted, and an extension section 44*f*. The first internal gear 44 is formed of a single member internally including these members. The first internal gear 44 is formed of a resin having a rigidity.

The peripheral end portion 44*c* includes a protrusion portion 44*g* which is externally fitted to one end of the motor frame 17 and a protrusion portion 44*h* which is internally fitted to one end portion of the outer peripheral housing 53. The protrusion portion 44*h* abuts against the main bearing 54 so as to position the main bearing 54 in the axial direction (refer to FIG. 1).

The first internal gear 44 further includes an extension portion 44*i* which is adjacent to the bearing disposition section 44*d* and extends toward a motor-side end surface of the input bearing 51. The input bearing 51 which is internally fitted to the bearing disposition section 44d abuts against the extension portion 44i and the axial position of the input bearing 51 can be determined.

The regulating member disposition section 44e has a stepwise recessed shape to which the first regulating member 46 is fitted, the first regulating member 46 is internally fitted to the regulating member disposition section 44e, and a radial movement of the first regulating member 46 is regulated. The first internal gear 44 further includes a slit s11 between the tooth section 44a and the regulating member disposition section 44e, and teeth of the tooth section 44a and the first regulating member 46 are separated from each other by the slit s11 such that the teeth and the first regulating member 46 do not interfere with each other.

The bearing disposition section 44d and the regulating member disposition section 44e are provided at positions which are closer to the inner periphery than the tooth section 44a and do not overlap the tooth section 44a when viewed in the radial direction. The peripheral end portion 44c is provided at a position which is closer to the outer periphery than the tooth section 44a and overlaps the tooth section 44a when viewed in the radial direction.

The extension section 44f is an element which separates the tooth section 44a and the peripheral end portion 44c from each other by a predetermined length, and an axial width dimension of the extension section 44f is smaller than a width dimension of the tooth section 44a. The extension section 44f is thinly formed and a gap is provided between the extension section 44f and the second internal gear 45. Accordingly, an accommodation space of the stator 15 can increase and weight saving of the first internal gear 44 can be improved.

The second internal gear 45 has an annular configuration in which a sectional shape (except for a screw hole h1) of FIG. 4B is continuous in the circumferential direction and the plurality of screw holes h1 are provided at a plurality of locations in the circumferential direction. The second internal gear 45 includes a tooth section 45a in which internal teeth are provided, a bearing disposition section 45b in which the main bearing 54 is disposed, and a bulging portion 45c which bulges toward the counter-motor side (the side opposite to the motor 10) in the axial direction. The second internal gear 45 is formed of a resin having a rigidity.

The tooth section 45a includes internal teeth having the same axial width dimension as that of the tooth section 44a of the first internal gear 44.

The bearing disposition section 45b is provided at a position which is closer to the outer periphery than the second internal gear 45 and overlaps the tooth section 45a when viewed in the radial direction. The second internal gear 45 further includes an extension portion 45d which is adjacent to the motor side of the bearing disposition section 45b and extends in the radial direction. According to this configuration, the main bearing 54 is externally fitted from the counter-motor side to the bearing disposition section 45b, the main bearing 54 is pushed until the main bearing 54 abuts against the extension portion 45d, and thus, the axial position of the main bearing 54 can be determined.

The bulging portion 45c has a shape which bulges in the axial direction so as to be fitted into a recessed groove 48a of the bearing housing 48 provided on the motor side in the axial direction (refer to FIG. 1). In the bulging portion 45c, a screw hole h1 which is open to the counter-motor side end surface is provided, and the bulging portion 45c is fixed to the bearing housing 48 by using a screw n1.

The numbers of teeth of the tooth section 44a of the first internal gear 44 and the tooth section 45a of the second internal gear 45 are different from each other. For example, the number of teeth of the first internal gear 44 is larger than that of the external gear 42 by two, and the numbers of teeth of the second internal gear 45 and the external gear are the same as each other.

As shown in FIG. 1, the main bearing 54 is a ball bearing and supports the first internal gear 44 and the second internal gear 45 such that the first and second internal gears 44 and 45 can rotate relative to each other.

As shown in FIG. 1, the input bearing 51 and the counter-motor side input bearing 52 are a ball bearing and rotatably support the input shaft 41 on both sides of the wave generator 41a in the axial direction.

The outer peripheral housing 53 has an annular shape in which a sectional shape (except for screw holes h2 and h3) of FIG. 1 is continuous in the circumferential direction, the screw holes h2 and h3 are provided at a plurality of locations in the circumferential direction, and the outer peripheral housing 53 mainly covers the outer peripheral side of the main bearing 54 in the gear motor 1. The outer peripheral housing 53 is formed of a metal and a resin. The screw hole h3 of the outer peripheral housing 53 and the screw hole h5 of the first internal gear can be used to fix a support member by a screw.

The outer peripheral housing 53 is adjacent to the peripheral end portion 44c (FIG. 4) of the first internal gear 44 in the axial direction and is connected to the first internal gear 44 via a screw n2. The outer peripheral housing 53 includes a bearing disposition section 53a (FIG. 6) to which the main bearing 54 is internally fitted. An extension portion 53b (FIG. 6) extending inward is provided on the counter-motor side of the bearing disposition section 53a, the extension portion 53b and the protrusion portion 44g of the first internal gear 44 abut against the main bearing 54 from both sides in the axial direction, and thus, the main bearing 54 is fixed.

The bearing housing 48 has an annular configuration in which a sectional shape (except for a screw hole h6 and a fitting hole h7) of FIG. 4A is continuous in the circumferential direction and the screw holes h6 and the fitting holes h7 are provided at a plurality of locations in the circumferential direction. The bearing housing 48 has an opening, in which a portion of the input shaft 41 is disposed, at a center when viewed in the axial direction, and the bearing housing 48 covers the counter-motor side of the speed reducer 40. The bearing housing 48 is formed of a metal or a resin. The bearing housing 48 is fixed to the second internal gear 45 by fastening the screw n1 via the screw hole h6 (refer to FIG. 1). For example, an output-side member can be fitted into the fitting hole h7.

As shown in FIG. 4A, a bearing disposition section 48b to which the counter-motor side input bearing 52 is internally fitted is provided in an opening of the bearing housing 48. An extension portion 48c extending toward an inner peripheral side is provided on the counter-motor side of the bearing disposition section 48b. The counter-motor side input bearing 52 abuts against the extension portion 48c, and thus, an axial position of the counter-motor side input bearing 52 can be determined.

The bearing housing 48 further includes an outer fitting portion 48d which extends to the outer peripheral side of the bulging portion 45c (FIG. 4B) of the second internal gear 45. The outer fitting portion 48d extends to an end portion of the main bearing 54 in the axial direction and abuts against the main bearing 54, and thus, the axial position of the main bearing 54 can be regulated.

The first regulating member 46 has an annular shape in which a sectional shape of FIG. 1 is continuous in the circumferential direction and is disposed on the motor sides of the external gear 42 and the wave generator bearing 43. The first regulating member 46 has a planar contact surface orthogonal to the central axis O1 and regulates the axial movements of the external gear 42 and the wave generator bearing 43 by the contact surface. The contact surface of the first regulating member 46 faces (retainers of) the external gear 42 and the wave generator bearing 43 in the axial direction. An outer diameter of the first regulating member 46 is smaller than an inner diameter of a constituent element on the counter-motor side of the tooth section 44a of the first internal gear 44 and an inner diameter of the second internal gear 45. An inner peripheral edge portion of the first regulating member 46 is positioned in a space secured by an inclined portion between the wave generator 41a of the input shaft 41 and the first bearing disposition section w3, and thus, it is possible to secure the large contact surface having a margin.

The second regulating member 47 has an annular shape in which a sectional shape of FIG. 1 is continuous in the circumferential direction and is disposed on the counter-motor sides of the external gear 42 and the wave generator bearing 43. The second regulating member 47 has a planar contact surface orthogonal to the central axis O1 and regulates the axial movements of the external gear 42 and the wave generator bearing 43 by the contact surface. An outer diameter of the second regulating member 47 is larger than the outer diameter of the first regulating member 46 and is larger than the inner diameters of the tooth sections 44a and 45a of the first internal gear 44 and the second internal gear 45. The contact surface of the second regulating member 47 faces (retainers) of the external gear 42 and the wave generator bearing 43 and the tooth section 45a of the second internal gear 45 in the axial direction. An inner peripheral edge portion of the second regulating member 47 is positioned in a space secured by an inclined portion between the wave generator 41a of the input shaft 41 and the second bearing disposition section w4, and thus, it is possible to secure the large contact surface having a margin.

Operation Explanation

If the coil 13 is energized and a rotational torque is generated in the rotor 12, the input shaft 41 integrated with the rotor 12 rotates about the central axis O1. A motion of the wave generator 41a according to the rotation of the input shaft 41 is transmitted to the external gear 42. Since a portion of the external gear 42 meshes with the fixed first internal gear 44, the external gear 42 does not rotate following the rotation of the wave generator 41a, and the wave generator 41a rotates relative to the external gear 42 inside the external gear 42. In addition, the external gear 42 is regulated along the outer peripheral surface of the wave generator 41a, and thus, the external gear 42 is bent and oscillated according to the rotation of the wave generator 41a. A period of this oscillation is proportional to a rotation period of the wave generator 41a.

If the external gear 42 is deformed by the rotation of the wave generator 41a, a large diameter portion (long axis portion) of the wave generator 41a moves in the circumferential direction, and thus, a meshed position between the external gear 42 and the first internal gear 44 is changed in the circumferential direction. Since the numbers of teeth of the external gear 42 and the first internal gear 44 are different from each other, every time the meshed position goes round, meshing teeth of the external gear 42 and the first internal gear 44 are displaced, and thus, the external gear 42 rotates. For example, if the number of teeth of the first internal gear 44 is 102 and the number of teeth of the external gear 42 is 100, the rotation motion of the wave generator 41a is decelerated at a reduction ratio of 100:2 and is transmitted to the external gear 42.

Meanwhile, the external gear 42 and the second internal gear 45 similarly mesh with each other, and thus, a meshed position between the external gear 42 and the second internal gear 45 is changed in the rotation direction by the rotation of the wave generator 41a. Since the numbers of teeth of the second internal gear 45 and the external gear 42 are the same as each other, the external gear 42 and the second internal gear 45 are not rotated relative to each other, and the rotation motion of the external gear 42 is transmitted to the second internal gear 45 at a reduction ratio of 1:1. Accordingly, the rotation motion of the wave generator 41a is decelerated and is output to the second internal gear 45 which becomes the output shaft and the bearing housing 48.

During the energization of the coil 13, even when a distance between the cover section 44b and the coil end 13a is short, the cover section 44b is formed of a resin (non-conductive material), and thus, high insulation is secured between the coil 13 and the outside of the device, or between the coil 13 and the speed reducer 40. In addition, the cover section 44b and the coil 13 are in contact with each other. However, the contact surfaces thereof slide against each other such that the cover section 44b and the coil 13 are movable relative to each other. Accordingly, even when the coil 13 generates heat or thermally expands by the energization of the coil 13, only a very small distortion force is generated in the contact portion between the cover section 44b and the coil 13, which hardly affects durability of the cover section 44b and the stator 15.

Assembling Method

Figure 5:
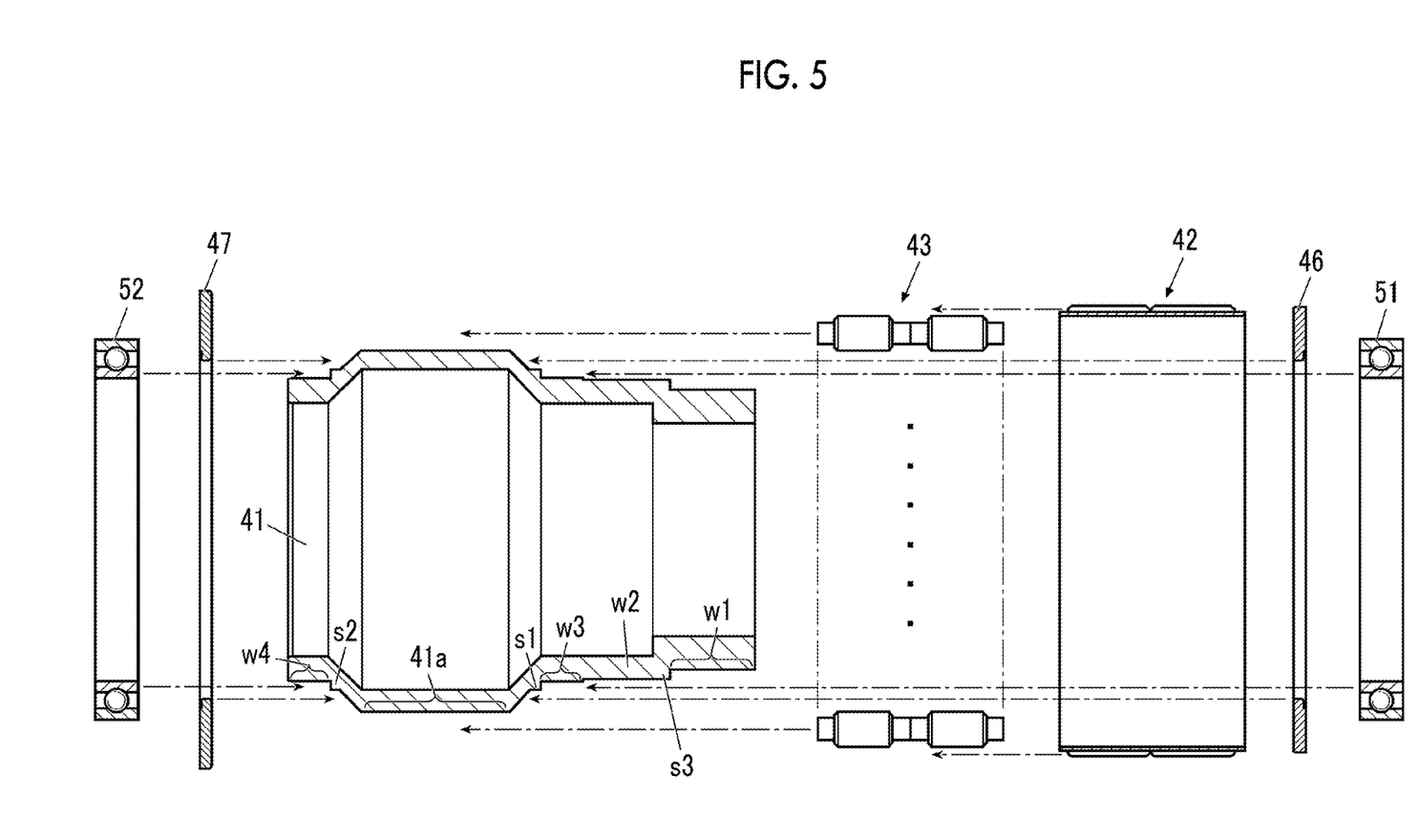
FIG. 5 is an explanatory view showing an assembling step of an input shaft assembly.
Figure 6:
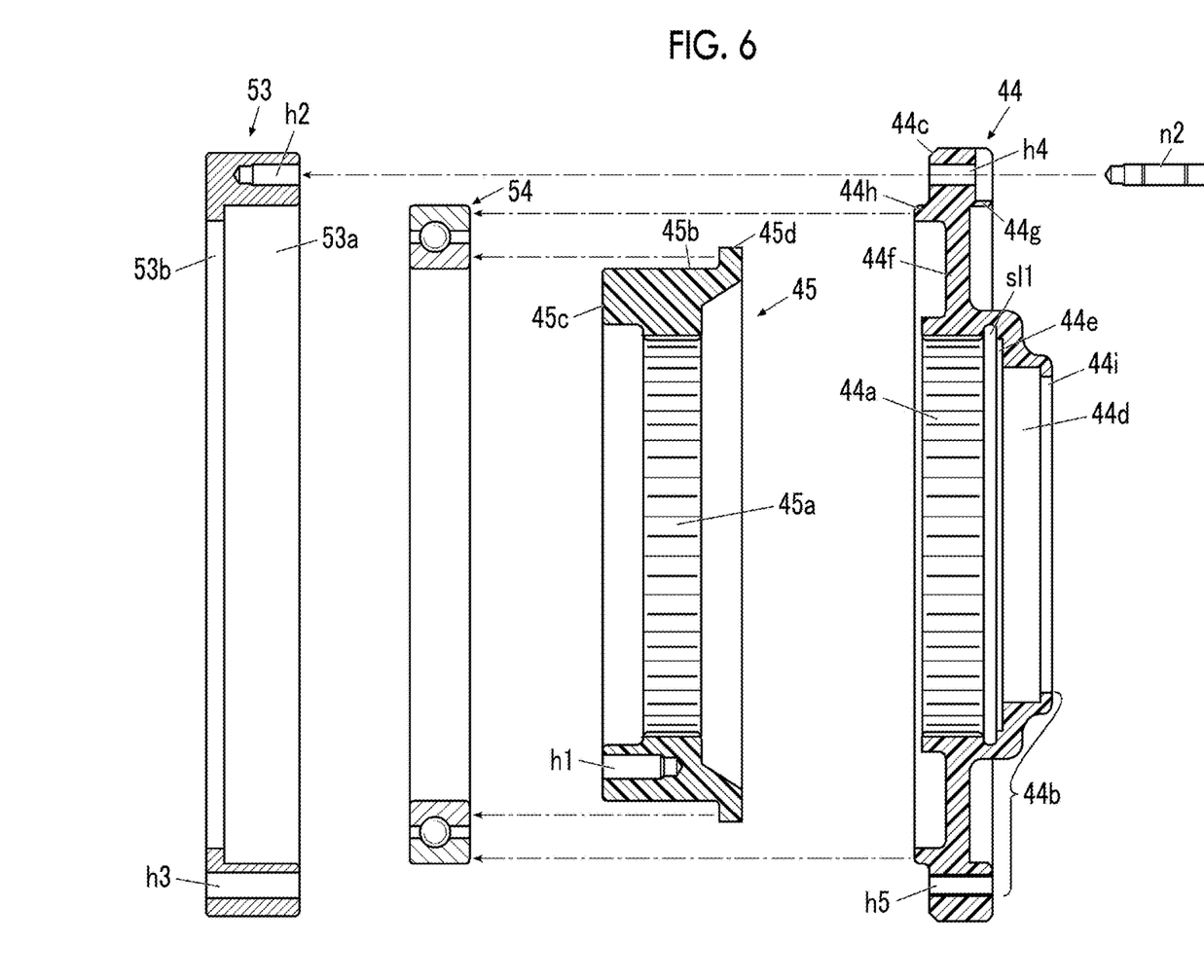
FIG. 6 is an explanatory view showing an assembling step of an internal gear assembly.
Figure 7:
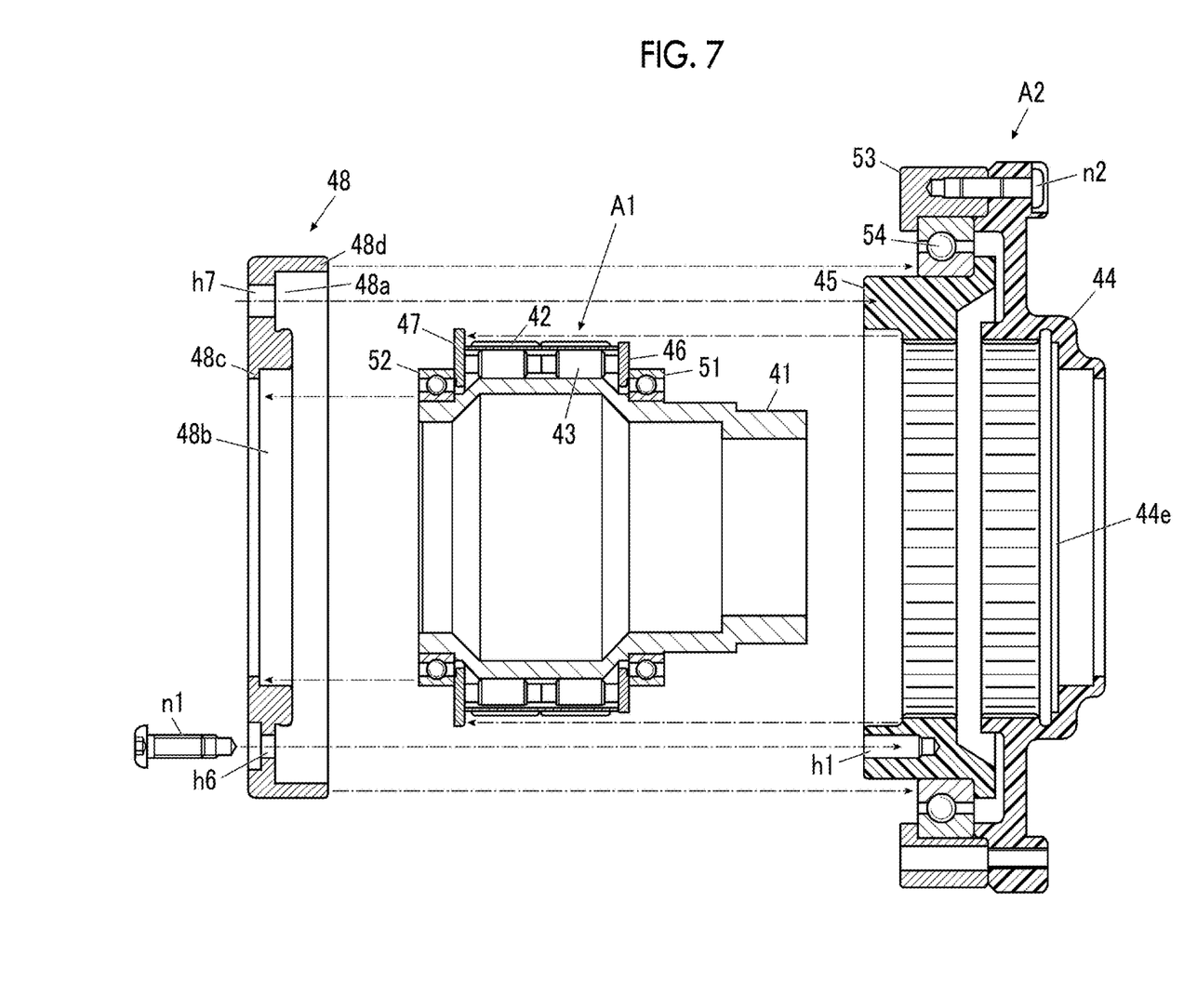
FIG. 7 is an explanatory view showing a step of assembling a speed reducer from a plurality of assemblies.
Figure 8:
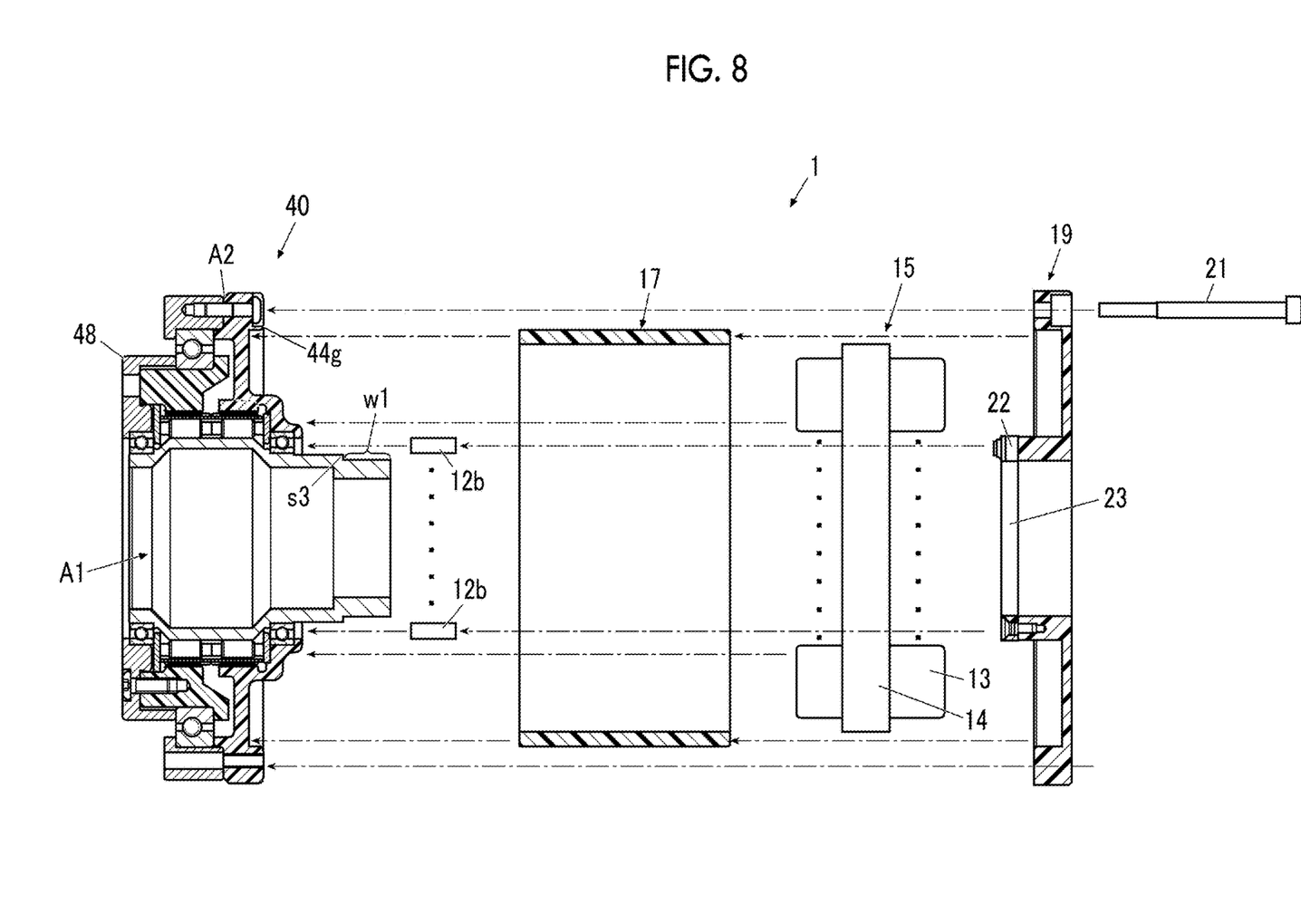
FIG. 8 is an explanatory view showing a step of assembling a gear motor from the speed reducer and motor parts.

FIG. 5 is an explanatory view showing an assembling step of an input shaft assembly. FIG. 6 is an explanatory view showing an assembling step of an internal gear assembly. FIG. 7 is an explanatory view showing a step of assembling a speed reducer from a plurality of assemblies. FIG. 8 is an explanatory view showing a step of assembling a gear motor from the speed reducer and motor parts.

The gear motor 1 according to the present embodiment can be assembled as follows. First, as shown in FIG. 5, the input shaft 41, the input bearing 51, the counter-motor side input bearing 52, the wave generator bearing 43, the external gear 42, the first regulating member 46, and the second regulating member 47 are assembled to each other so as to assemble an input shaft assembly A1 (FIG. 7).

In order to assemble the input shaft assembly A1, an assembly man causes the second regulating member 47 and the counter-motor side input bearing 52 to pass through the input shaft 41 from the counter-motor side in this order in a state where the wave generator bearing 43 and the external gear 42 are assembled to the input shaft 41. Accordingly, the second regulating member 47 is interposed between the wave generator bearing 43 and the counter-motor side input bearing 52 so as to be held. In addition, the counter-motor side input bearing 52 is externally fitted to the second bearing disposition section w4 so as to be fixed.

In addition, the assembly man causes the first regulating member 46 and the input bearing 51 to pass through the input shaft 41 from the motor side. Accordingly, the first regulating member 46 is interposed between the wave generator bearing 43 and the input bearing 51 so as to be held. In addition, the input bearing 51 is externally fitted to the first bearing disposition section w3 so as to be fixed.

In addition, as shown in FIG. 6, in parallel with the assembly of the input shaft assembly A1, the assemblyman assembles the first internal gear 44, the second internal gear 45, the main bearing 54, and the outer peripheral housing 53 to each other so as to assemble an internal gear assembly A2 (FIG. 7).

In order to assemble the internal gear assembly A2, the assemblyman pushes the main bearing 54 until the main bearing 54 abut against the extension portion 45d while externally fitting the main bearing 54 to the second internal gear 45. In addition, the assembly man externally fits the outer peripheral housing 53 to the main bearing 54 and pushes the outer peripheral housing 53 until the extension portion 53b abuts against the main bearing 54. Next, the assembly man fits the portion of the protrusion portion 44h of the first internal gear 44 to the outer peripheral housing 53 and fastens the screw n2 so as to fix the first internal gear 44 to the outer peripheral housing 53. In this case, the main bearing 54 is interposed between the protrusion portion 44h of the first internal gear 44 and the extension portion 53b of the outer peripheral housing so as to be fixed, the extension portion 45d abuts against the main bearing 54, and thus, the axial position of the second internal gear 45 is determined.

Subsequently, as shown in FIG. 7, the assembly man assembles the input shaft assembly A1, the internal gear assembly A2, and the bearing housing 48 to each other. The internal gear assembly A2 is inserted into the input shaft assembly A1 from the motor side so as to be assembled. This assembly is possible because the inner diameter of the tooth section 44a of the first internal gear 44 and the inner diameter of the second internal gear 45 are larger than the outer diameters of the input bearing 51 and the first regulating member 46. When this assembly is performed, the first regulating member 46 is fitted into the regulating member disposition section 44e of the first internal gear 44.

Next, the assembly man assembles the bearing housing 48 from the counter-motor side. In this case, the bearing disposition section 48b of the bearing housing 48 is externally fitted to the counter-motor side input bearing 52 and the counter-motor side input bearing 52 is pushed until the counter-motor side input bearing 52 abuts against the extension portion 48c. In this case, a tip of the outer fitting portion 48d of the bearing housing 48 abuts against the main bearing 54 and the main bearing 54 is fixed. In this case, the screw n1 is fastened and the bearing housing 48 is fixed to the second internal gear 45.

Subsequently, as shown in FIG. 8, the assembly man assembles respective parts of the motor 10 to the speed reducer 40 so as to assemble the gear motor 1. First, the assembly man directly fixes the rotor magnet 12b to the rotor disposition section w1 of the input shaft 41 of the speed reducer 40. One end of the rotor magnet 12b abuts against the step portion s3 of the rotor disposition section w1, and thus, the axial position of the rotor magnet 12b is determined.

Next, the assembly man assembles the motor frame 17 and the stator 15 from the motor side of the speed reducer 40. Here, one end of the motor frame 17 is internally fitted to the protrusion portion 44g of the peripheral end portion 44c of the first internal gear 44 so as to be assembled, and the outer peripheral surface of the stator core 14 come into contact with the inner peripheral surface of the motor frame 17 such that the stator 15 is held. In addition, the load-side end portion of the stator 15 in the axial direction comes into contact with a portion of the first internal gear 44, and thus, the axial position of the stator 15 is determined.

In addition, the assemblyman fits the motor cover 19, to which the sensor 22 is attached via the bracket 23, to one end of the motor frame 17, and connects the motor cover 19 to the internal gear assembly A2 via the bolt 21. The bolt holes through which the bolts 21 pass are provided at a plurality of locations having the circumferential positions different from the screw hole h2 through which the screws n2 passes, the plurality of bolts 21 are fastened, and thus, the gear motor 1 is assembled.

Embodiment Effects

As described above, according to the gear motor 1 of the present embodiment, the protrusion portion 41b of the input shaft 41 of the speed reducer 40 protruding toward the motor 10 side functions as the rotor shaft. In addition, in the input shaft 41, the first bearing disposition section w3 in which the input bearing 51 is disposed and the rotor disposition section w1 in which the rotor magnet 12b is disposed are disposed in this order from the speed reducer 40 side toward the motor 10 side. In addition, the outer diameter of the rotor disposition section w1 is equal to or less than the outer diameter of the first bearing disposition section w3, and the rotor magnet 12b is directly fixed to the rotor disposition section w1. According to this configuration, it is possible to decrease the number of parts of the gear motor 1, it is possible to easily assemble the gear motor 1 with high assembly accuracy, and it is possible to the positional accuracy of the rotor magnet 12b.

Moreover, according to the gear motor 1 of the above-described embodiment, the input shaft 41 has a hollow structure, and the tubular inner wall portion 19a whose space portion communicates with the hollow portion of the input shaft 41 is provided in the motor cover 19 which covers the counter-load side of the motor 10. In addition, the sensor 22 for detecting the rotation position is disposed on the speed reducer 40 side end surface of the inner wall portion 19a. According to this configuration, it is possible to provide the sensor 22 with high assembly accuracy without increasing the number of parts. In addition, the space portion of the tubular inner wall portion 19a of the motor cover 19 and the hollow structure of the input shaft 41 communicates with each other, and thus, the space portion extending in the axial direction is obtained in the gear motor 1, and a wire, a shaft, or the like can pass through the space portion.

Moreover, according to the gear motor 1 of the above-described embodiment, the motor-side movements of the external gear 42 and the wave generator bearing 43 can be regulated by the motor-side first regulating member 46. Moreover, the outer diameter of the first regulating member 46 is smaller than the inner diameter of the tooth section 44a of the first internal gear 44 and the inner diameter of the second internal gear 45. According to this configuration, the first internal gear 44 and the second internal gear 45 can be assembled to a constituent element, in which the wave generator bearing 43, the external gear 42, and the first regulating member 46 are assembled to the input shaft 41, from the first regulating member 46 side. According to this configuration, it is possible to simplify the assembly step of the speed reducer 40, and it is possible to assemble the speed reducer 40 with a small number of parts and high accuracy.

In addition, according to the gear motor 1 of the present embodiment, the counter-motor side movements of the external gear 42 and the wave generator bearing 43 can be regulated by the counter-motor side second regulating member 47. Moreover, the outer diameter of the second regulating member 47 is larger than the outer diameter of the first regulating member 46. In addition, the outer diameter of the second regulating member 47 is larger than the inner diameter of the tooth section 44a of the first internal gear 44 and the inner diameter of the second internal gear 45. According to the second regulating member 47 having the above-described configuration and the above-described first regulating member 46, it is possible to regulate the axial movements of the external gear 42 and the wave generator bearing 43 without affecting the assembly of the first internal gear 44 and the second internal gear 45.

In addition, according to the gear motor 1 of the above-described embodiment, the outer fitting portion 48d (FIG. 7) which is externally fitted to the second internal gear 45 and abuts against the main bearing 54 is provided in the bearing housing 48. According to this configuration, it is possible to fix the main bearing 54 with high strength without increasing the number of parts.

In addition, according to the gear motor 1 of the above-described embodiment, after the input shaft assembly A1 and the internal gear assembly A2 are assembled to each other, the assembled assemblies and the bearing housing 48 are assembled to each other, and thus, it is possible to assemble the speed reducer 40 of the gear motor 1. Moreover, in the rotor magnet is directly fixed to the input shaft 41 of the assembled speed reducer 40, and thereafter, remaining parts of the motor 10 are assembled, and it is possible to assemble the gear motor 1. According to this step, it is possible to assemble the gear motor 1 with the small number of parts and high positional accuracy.

Hereinbefore, the embodiment of the present invention is described. However, the present invention is not limited to the above-described embodiment. For example, in the above-described embodiment, the example in which the bending meshing type speed reducer is used as the speed reducer is described. However, as the speed reducer, an eccentric oscillating type speed reducer may be used. In this case, an eccentric body, which is provided on the input shaft such that a center of an outer peripheral surface of the eccentric body is eccentric from the central axis O1, corresponds to the oscillating portion of the input shaft which oscillates the external gear.

Moreover, in the above-described embodiment, the materials of some parts are described to be specified. However, the materials can be changed variously. For example, the parts described to be formed of a resin may use a composite material of a resin and other elements or a bake material (paper bake material or a cloth bake material). In addition, the motor cover 19 covering the stator 15 and the cover section 44b of the first internal gear 44 may be formed of a metal, and may be disposed to be separated from the stator 15 by a predetermined insulation distance. Moreover, the detailed portions described the embodiment may be appropriately changed within a scope which does not depart from the gist of the present invention.

In addition, in the above-described embodiment, the outer diameter of the rotor magnet 12b fixed to the rotor disposition section w1 of the input shaft 41 is larger than the inner diameter of the input bearing 51 or the inner diameter of the first regulating member 46. Accordingly, after the rotor magnet 12b is fixed, the components of the speed reducer 40 cannot be removed from the motor side. However, the outer diameter of the rotor magnet 12b fixed to the rotor disposition section w1 of the input shaft 41 may be smaller than both or any one of the inner diameter of the input bearing 51 and the inner diameter of the first regulating member 46. In this case, after the motor cover 19, the motor frame 17, and the stator 15 are removed, the first internal gear 44, the input bearing 51, and the first regulating member 46 can be removed from the motor side so as to be replaced in a state where the rotor magnet 12b is fixed to the rotor disposition section w1 of the input shaft 41. Moreover, other components (for example, the wave generator bearing 43 or the external gear 42) of the speed reducer can be removed from the motor side so as to be replaced.

It should be understood that the invention is not limited to the above-described embodiment, but may be modified into various forms on the basis of the spirit of the invention. Additionally, the modifications are included in the scope of the invention.

What is claimed is:
1. A gear motor comprising:
a speed reducer;
a motor;
a motor cover; and
a sensor,
wherein the speed reducer comprises:
an internal gear,
an external gear which internally meshes with the internal gear,
an input shaft which comprises an oscillating portion oscillating the external gear,
an oscillating bearing which is disposed between the external gear and the oscillating portion, and
an input bearing which supports the input shaft,
wherein the input shaft comprises:
a protrusion portion protruding from a motor side such that a rotor of the motor is provided in the protrusion portion; and
a bearing disposition section in which the input bearing is disposed;
the protrusion portion comprises:
a rotor disposition section in which the rotor is disposed; and
an extension section;
wherein the bearing disposition section, the extension section, and the rotor disposition section arranged in this order from a speed reducer side toward the motor side,
wherein an outer diameter of the rotor disposition section is smaller than an outer diameter of the extension section, and the outer diameter of the extension section is smaller than an outer diameter of the bearing disposition section, and
wherein a rotor magnet is directly fixed to the rotor disposition section,
wherein the input shaft has a hollow structure,
wherein the motor cover covers a counter-load side of the motor and comprises a tubular portion having a space portion which communicates with a hollow portion of the input shaft; and
wherein the sensor is disposed on an end portion on the rotor magnet side of the tubular portion and detects a magnetic flux of the rotor magnet.

2. The gear motor according to claim 1,
wherein the speed reducer is a bending meshing type speed reducer in which a first internal gear and a second internal gear are disposed in this order from the motor side toward the counter-motor side as the internal gear,
wherein the speed reducer further comprises:
a counter-motor side input bearing which supports the counter-motor side of the input shaft, a bearing housing which supports the counter-motor side input bearing, and a main bearing which is disposed between the first internal gear and the second internal gear and rotates the first internal gear and the second internal gear relative to each other, and wherein the bearing housing comprises an outer fitting portion which is externally fitted to the second internal gear and regulates an axial movement of the main bearing.

3. A gear motor comprising:

a speed reducer; and a motor, wherein the speed reducer comprises:

an internal gear, an external gear which internally meshes with the internal gear, an input shaft which comprises an oscillating portion oscillating the external gear, an oscillating bearing which is disposed between the external gear and the oscillating portion, and an input bearing which supports the input shaft, wherein the input shaft comprises, in this order from a motor side toward a speed reducer side:

a protrusion portion which protrudes from the motor side such that a rotor of the motor is provided in the protrusion portion, and a bearing disposition section in which the input bearing is disposed and a rotor disposition section in which the rotor, wherein an outer diameter of the rotor disposition section is equal to or less than an outer diameter of the bearing disposition section, wherein a rotor magnet is directly fixed to the rotor disposition section, wherein the gear motor further comprises a first regulating member which is disposed on the motor side of the external gear and regulates an axial movement of the external gear, wherein an outer diameter of the first regulating member is smaller than an inner diameter of a tooth section of the internal gear, wherein the gear motor further comprises:

a second regulating member which is disposed on a counter-motor side of the external gear and regulates the axial movement of the external gear, and wherein an outer diameter of the second regulating member is larger than the outer diameter of the first regulating member.

4. The gear motor according to claim 3, wherein the outer diameter of the second regulating member is larger than the inner diameter of the tooth section of the internal gear.

5. An assembling method of a gear motor, the gear motor comprising:

a first internal gear, a second internal gear, a main bearing which is disposed between the first internal gear and the second internal gear and rotates the first internal gear and the second internal gear relative to each other, an external gear which internally meshes with the first internal gear and the second internal gear, an input shaft which comprises an oscillating portion oscillating the external gear and a protrusion portion which protrudes from the motor side such that the rotor is provided in the protrusion portion, an oscillating bearing which is deposed between the oscillating portion and the external gear, an input bearing which supports the motor side of the input shaft, a counter-motor side input bearing which supports a counter-motor side of the input shaft, and a bearing housing which supports the counter-motor side input bearing, the method comprising:

a step of assembling an internal gear assembly in which the first internal gear and the second internal gear are assembled to each other via the main bearing;

a step of assembling an input shaft assembly in which the oscillating bearing, the external gear, the input bearing, and the counter-motor side input bearing are assembled to the input shaft;

a step of externally fitting the internal gear assembly to the input shaft assembly from the motor side; and a step of externally fitting the bearing housing to the input shaft assembly from the counter-motor side.

6. The assembling method of a gear motor according to claim 5, further comprising:

a step of fixing a rotor magnet to the protrusion portion of the input shaft after assembling the input shaft assembly, the internal gear assembly, and the bearing housing to each other.

* * * * *